United States Patent
Masarik

(10) Patent No.: US 9,724,596 B2
(45) Date of Patent: Aug. 8, 2017

(54) VIDEO GAME CONTROLLER WITH HANDLEBAR CLIP

(71) Applicant: Stephen Vincent Masarik, Glenmoore, PA (US)

(72) Inventor: Stephen Vincent Masarik, Glenmoore, PA (US)

(*) Notice: Subject to any disclaimer, the term of this patent is extended or adjusted under 35 U.S.C. 154(b) by 156 days.

(21) Appl. No.: 14/629,792

(22) Filed: Feb. 24, 2015

(65) Prior Publication Data

US 2016/0243437 A1    Aug. 25, 2016

(51) Int. Cl.
*A63F 13/24*    (2014.01)
*A63B 71/00*    (2006.01)
*A63F 13/00*    (2014.01)

(52) U.S. Cl.
CPC .............. *A63F 13/00* (2013.01); *A63F 13/24* (2014.09); *A63B 71/00* (2013.01)

(58) Field of Classification Search
CPC ................................. A63F 13/24; A63B 71/00
See application file for complete search history.

(56) References Cited

U.S. PATENT DOCUMENTS

| | | | |
|---|---|---|---|
| 4,512,567 A | 4/1985 | Phillips | |
| 4,976,435 A | 12/1990 | Shatford et al. | |
| 5,764,164 A | 6/1998 | Cartabiano et al. | |
| 5,888,172 A | 3/1999 | Andrus et al. | |
| 6,547,575 B2 * | 4/2003 | Kato | H01R 35/025 439/165 |
| 7,470,040 B2 | 12/2008 | Sotokawa et al. | |
| 7,837,595 B2 | 11/2010 | Rice | |
| 8,241,126 B2 * | 8/2012 | Ambinder | A63F 13/24 463/38 |
| 8,641,525 B2 | 2/2014 | Burgess et al. | |
| 8,858,335 B2 * | 10/2014 | Helmes | G06F 1/1632 463/37 |
| 2004/0102246 A1 | 5/2004 | Chan | |
| 2005/0141957 A1 * | 6/2005 | Chen | F16B 2/12 403/290 |
| 2009/0023554 A1 | 1/2009 | Shim | |
| 2012/0149468 A1 | 6/2012 | Menheere et al. | |
| 2013/0267322 A1 | 10/2013 | South | |
| 2014/0323222 A1 | 10/2014 | Jaouen et al. | |

* cited by examiner

*Primary Examiner* — William H McCulloch, Jr.
*Assistant Examiner* — Yingchuan Zhang
(74) *Attorney, Agent, or Firm* — Keusey & Associates, P.C.

(57) ABSTRACT

A controller for a software driven processor, like a video game, having a handlebar clip. The controller includes two arcuate segments connected by a leaf spring to form a C-shaped spring jaw. A multimodal controller segment has a data input device pivotally coupled to one of the segments. The spring jaw can clip to a handlebar of an exercise device, like an exercise bicycle. The spring jaw may include a micro-USB jack to connect to a wired controller housing for conventional play and to recharge the controller's battery.

16 Claims, 3 Drawing Sheets ature VIDEO GAME CONTROLLER WITH HANDLEBAR CLIP

BACKGROUND OF THE INVENTION

1. Field of the Invention

The invention relates to a video game controller with a handlebar clip.

2. The Prior Art

Video game controllers have been developed in various configurations for ergonomic benefits and different mounting options. U.S. Pat. No. 7,470,040 discloses a trackball with a specially configured bracket to couple to the side of a laptop. U.S. Patent Application Publication 2013/0267322 shows a controller for gripping to the side of a tablet. The controller includes a data input pad and three articulating portions that pivot to grip onto devices of various thicknesses. The controller suffers from several drawbacks. First, it can only be attached to flat devices. Second, it only includes wireless connectivity and therefore will require frequent battery changes. Finally, it cannot operate as a stand-alone controller.

U.S. Pat. No. 4,512,567 and U.S. Pat. No. 4,976,435 and U.S. Pat. No. 7,837,595 disclose two momentary pushbuttons mounted on a strap that can be wrapped around handle bars of an exercise bicycle. U.S. Pat. No. 5,888,172 shows other types of data input devices mounted on straps that can be wrapped around the handle bars of an exercise bicycle. U.S. Patent Application Publication 2014/0323222 has a dedicated gearshift type controller that clamps onto the edge of a flat surface. U.S. Patent Application Publication 2004/0102246 shows a controller that is pivotally connected to a portable game device. U.S. Pat. No. 5,764,164 discloses a controller that is pivotally connected to an arm strap. These dedicated controllers are limited to wired configurations and cannot operate as standalone controllers.

U.S. Patent Application Publication 2012/0149468 shows various data input devices that are built in to the handle of a sit-up exercise bar. FIGS. 3A and 3B disclose brackets that can allow remote controller devices to be mounted on the bar. U.S. Patent Application Publication 2009/0023554 discloses exercise equipment that is equipped with a dedicated screen and software driven processor to provide a virtual game environment.

It would be desirable to provide an inexpensive controller that can be flexibly configured to mount on handlebars and used as a conventional standalone controller. In addition, such a controller would automatically switch between a wireless mode for handlebar mode, and wired mode for conventional controller use.

SUMMARY OF THE INVENTION

It is therefore an object of the invention to provide a video game controller with handlebar clip.

It is a further object to provide a controller that can be flexibly configured to a conventional standalone controller.

It is another object to provide a controller that can automatically switch between wireless and wired operation mode.

These and other related objects are achieved according to the invention by a controller for a software driven processor, or as more commonly known, a video game controller. A C-shaped spring jaw is formed from a first arcuate segment and a second arcuate segment connected by a leaf spring. A multimodal controller segment having a data input device is pivotally coupled to the second arcuate segment. The pivotal coupling between the multimodal controller segment and the second arcuate segment comprises a hinge oriented orthogonal to the leaf spring.

The arcuate segments and the leaf spring reside in a first plane, and with the multimodal controller segment pivoting between a first orientation parallel to the first plane and a second orientation perpendicular to the first plane. The arcuate segments can resiliently flex away from each other to pass over a cylindrical bar, with said leaf spring biasing the arcuate segments toward each other to capture the cylindrical bar within the C-shaped spring jaw.

The software driven processor is a game console, a tablet or a personal computer. The controller further includes a wireless transmitter coupled to the data input device and located within one of said segments. The C-shaped spring jaw is adapted to clip onto a handlebar of exercise equipment. The multimodal controller segment is adapted to be supported against a first side of the handlebar facing a user, so that as a user grabs the handlebar their thumb lies over the data input device. The data input device is a button, a maintained contact button, a momentary contact button, a directional pushbutton, an analog joystick, a 4-button d-pad, a trackball, and/or combinations thereof.

The first arcuate segment includes a further data input device and is adapted to be supported against a second side of the handlebar facing away from a user, so that as a user grabs the handlebar their index finger lies over said further data input device 22a. The first arcuate segment includes two additional data input devices comprising buttons. The first arcuate segment is adapted to be supported against a second side of the handlebar facing away from a user, so that as a user grabs the handlebar their index and middle fingers lie over said two buttons.

The apparatus further includes a main controller housing having a docking station, with one of the segments having a jack for plugging into the docking station for wired communication and battery recharging. The jack resides on one of the arcuate segments and first data wires extend from the multimodal controller segment through the pivotal coupling 70 to the second arcuate segment. The jack resides on one of the arcuate segments and second data wires extend from the first arcuate segment to the second arcuate segment.

The three segments collectively comprise an articulating controller. The main controller housing has two docking stations to receive two articulating controllers disposed at the right and left hand sides of the main controller housing for integrated cooperative play. The data input device on the multimodal controller segment is selected a button, a maintained contact button, a momentary contact button, a directional pushbutton, an analog joystick, a 4-button d-pad, a trackball, and/or combinations thereof. The two articulating controllers are adapted for undocking from said main controller housing and for mounting on the right and left handlebars of exercise equipment to provide the user with remote cooperative player control.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
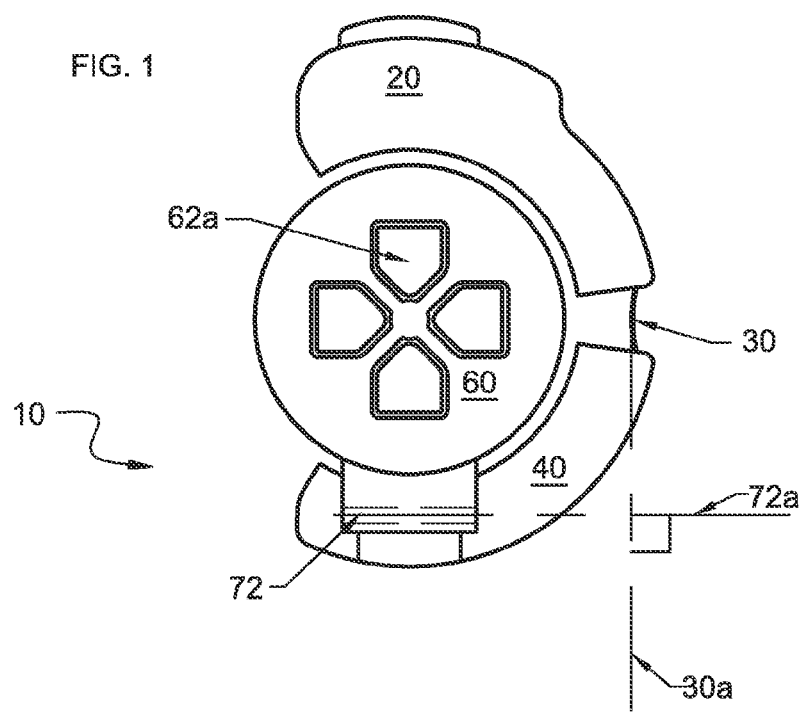
FIG. 1 is a top plan view of the video game controller according to the invention with the data input device folded toward the handle bar clip.

Referring now in detail to the drawings, and in particular FIG. 1, there is shown a controller 10 with a handlebar clip. The clip allows the controller to easily snap on and off the handlebar of a piece of exercise equipment. A user can then operate the controller, for example to play a video game, while working out on the exercise equipment.

Controller 10 includes a multimodal controller segment 60, having a data input device 62a that can range from a button, pad, joystick, or trackball. Multimodal controller segment 60 is portrayed as a circular disk, generally in the center of controller 10. The handlebar clip resides peripherally surrounding controller segment 60. More specifically, the handlebar clip includes a first arcuate segment 20, a centrally-mounted leaf spring 30, and a second arcuate segment 40. Controller segment 60 is pivotally coupled to second arcuate segment 40. The pivotal coupling comprises a hinge 72 having a hinge axis 72a that is oriented perpendicular to the leaf spring axis 30a.

Figure 2:
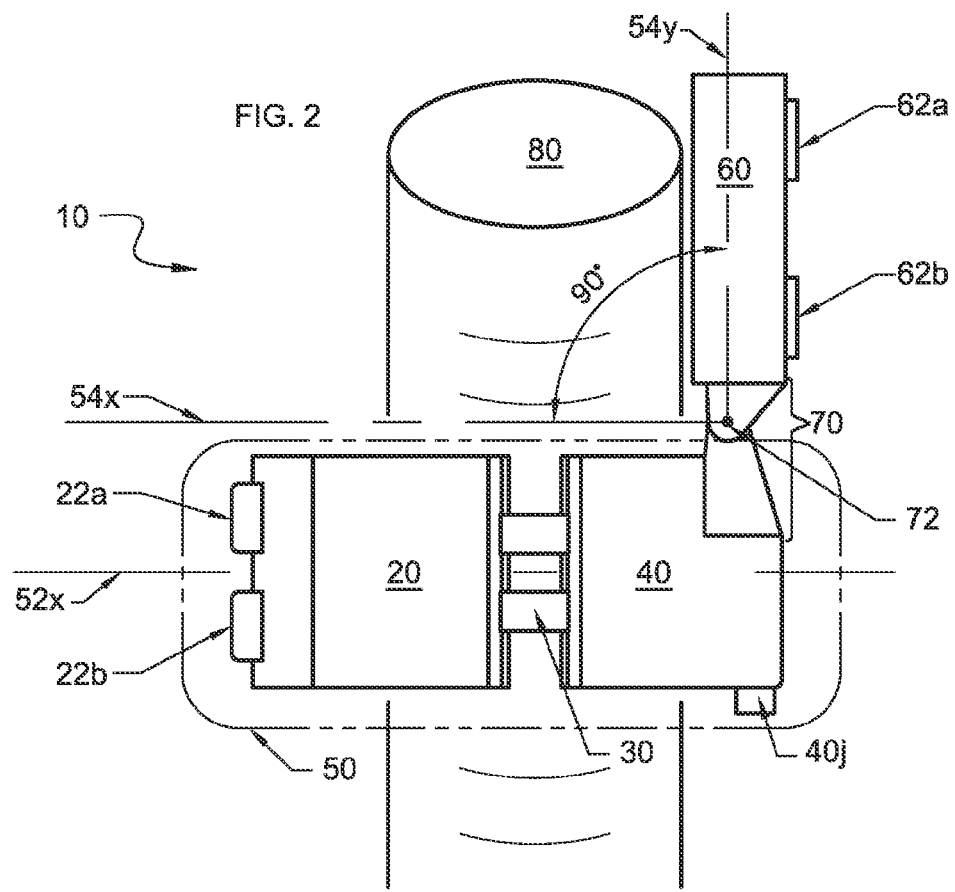
FIG. 2 is a right side elevational view of the video game controller with the data input device folded away from the handle bar clip.
Figure 3A:
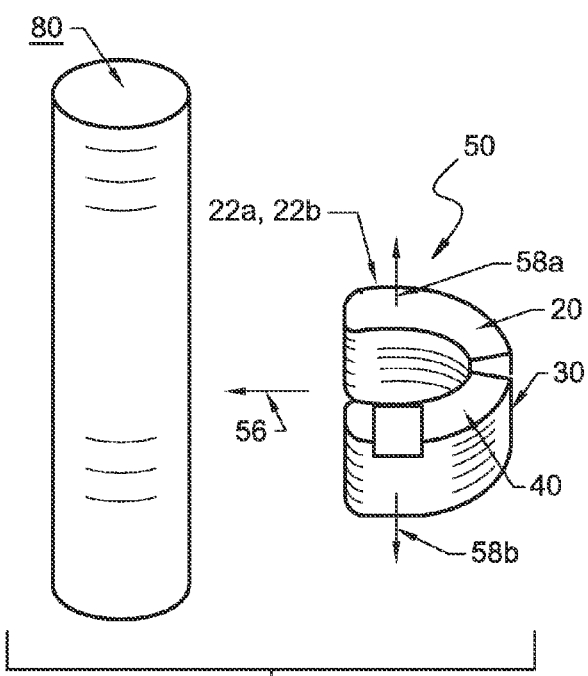
FIG. 3A is a front view of the clip being aligned with a handle bar.

If controller segment 60 was pivoted away from the handlebar clip, a C-shaped spring jaw 50 with an internal circular gap would exist (as can most easily be seen in FIG. 3A, with controller segment 60 removed for the sake of clarity). The components of C-shaped spring jaw 50 can be seen in FIG. 2. First arcuate segment 20 is flexibly connected to second arcuate segment 40 via one or two leaf springs 30. Multimodal controller segment 60 has a pivotally coupling 70 that attaches it to second arcuate segment 40. Pivotal coupling 70 may be implemented with a hinge 72.

The linear arrangement of segments 20, 40 and leaf spring 30 places these components in a first plane 52x. Multimodal controller segment 60 may reside in a first orientation 54x in which it is oriented in a plane parallel to first plane 52x. This parallel orientation is illustrated in FIG. 1. As can be seen in FIG. 2, multimodal controller segment 60 may alternately be pivoted to a second orientation 54y in which it is oriented in a plane perpendicular to first plane 52x. Placement of controller segment 60 in to second orientation 54y, provides clearance for a bar 80 to be disposed within the C-shaped spring jaw 50. The second orientation 54y places multimodal controller segment 60 parallel to handlebar 80 where it is upright for use, and supported against the bar. When the multimodal controller segment is removed from bar 80, the interference from the bar is no longer present, and segment 60 can pivot down to orientation 54x for compactness, and for placement onto a base unit.

To attach to the handlebar of an exercise machine, controller 10 is configured by pivoting controller segment 60 from first orientation 54x to second orientation 54y, as shown in FIG. 2. Then as can be seen in FIG. 3, C-shaped spring jaw 50 is moved towards handlebar 80 as shown by arrow 56. As the open end of spring jaw 50 contacts bar 80, leaf spring 30 allows segment 20 to flex away from segment 40 as shown by arrows 58a and 58b. When the end of the spring jaw passes the center of the bar, the biasing force of leaf spring 30 brings segments 20 and 30 back toward each other, in a direction opposite arrows 58a and 58b. Controller 10 is now mounted on bar 80, as can be seen in FIG. 3B, with multimodal controller segment 60 lying against bar 80.

When user grasps handlebar 80 with their left hand, their thumb would point up locating it on top of the data input device on controller segment 60. The other fingers would wrap around the handlebar, with the index finger and middle finger located on top of further data input button 22a and 22b. Data input device 62 could be a button, a maintained contact button, a momentary contact button, a directional pushbutton, an analog joystick, a 4-button d-pad, a trackball, or combinations thereof. A similar, mirror-image controller could be provided for the right hand or right handlebar. The controller sends wireless signals to provide the user with remote cooperative player control.

Figure 3B:
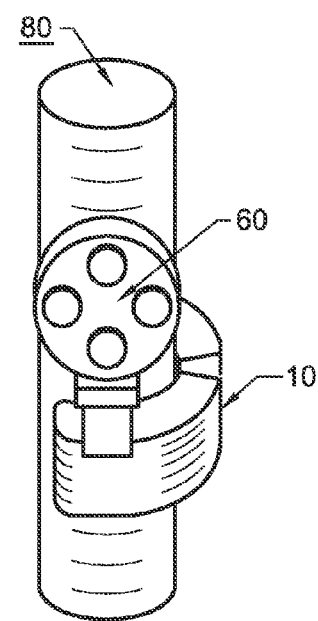
FIG. 3B shows the data input device with the clip attached to the handle bar.
Figure 4A:
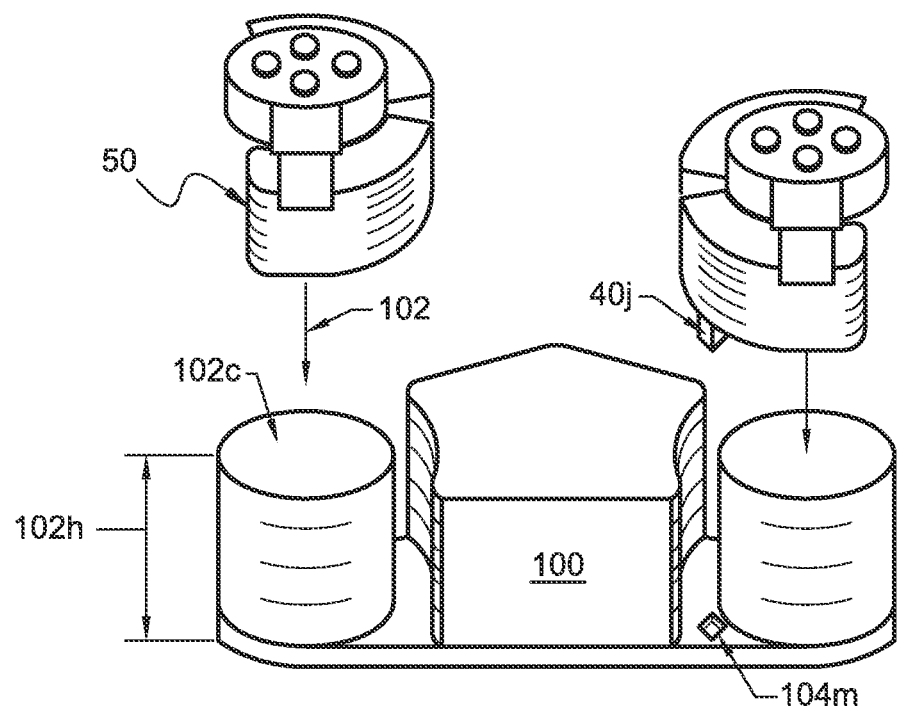
FIG. 4A is a perspective view showing two video game controllers aligned with a main controller housing.

After exercise is completed, the controller or controllers, are removed from the handlebar in an operation that proceeds opposite of that illustrated in FIGS. 3B and 3A. Controller segment 60 is pivoted back down from second orientation 54y to first orientation 54x. The hinge and leaf spring along with the three segments collectively comprise an articulating controller. FIG. 4A shows a main controller housing 100 with a docking station for each articulating controller. The docking station 102 is formed as a bar, handlebar or cylindrical section. The bar section has a height 102h equivalent to the height of spring jaw 50. Accordingly, spring jaw 50 can be set down on to the cylindrical section with controller segment 60 sitting on a circular top 102c.

Figure 4B:
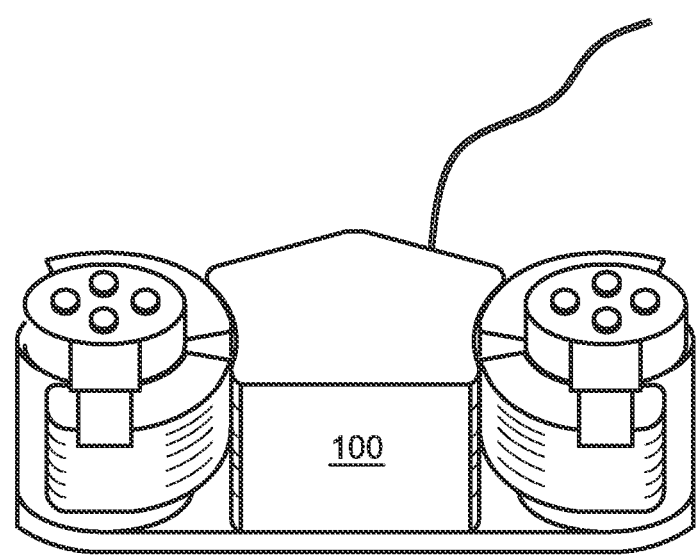
FIG. 4B is a perspective view with the video game controllers mounted to the main controller housing.

Main controller housing 100 may be configured as a wireless or wired controller. In one embodiment, controller housing 100 is wired. Section 20 or 40 includes a jack 40j, and main controller housing 100 includes a mating jack 104m. When plugged in as shown in FIG. 4B, controller 10 can recharge its batteries and communicate through the jack to utilize the main controller housing's wired connection. The jack and mating jack may be a USB-type jack, for example a mini-USB or micro-USB jack.

While a micro-USB jack can be mounted on any portion of controller 10, FIG. 2 shows one embodiment with jack 40j mounted on second arcuate segment 40. Segment 40 may contain a microprocessor and rechargeable battery. The data input device 62a,b would be connected to jack 40j via wires that pass through, or adjacent, hinge 70. Further data input device 22a,b would be connected to jack 40j via wires that pass through, or adjacent, leaf spring 30. The wires could be small gauge stranded wire or flat ribbon cable.

Jack 40j includes a sensor that determines whether controller 10 is uncoupled or coupled to mating jack 104m. The microprocessor received a signal from the sensor to indicate if the controller is connected or not. If uncoupled, the microprocessor would draw power from the onboard battery and activate the wireless transceiver. If coupled, the microprocessor would draw power from mating jack 104m to recharge the onboard battery. The wireless transceiver would be disabled, and signals from the data input devices 62, 22 would be routed through the micro-USB jack to the main controller housing 100.

Accordingly, FIG. 4B shows that the controller according to the invention may be used like a conventional controller. When the user wants to exercise, one or two controllers 10 are removed from main controller housing 100 and clipped to the handlebars of an exercise device. The controller 10 can automatically switch to wireless mode, for example, Bluetooth or IR or WiFi to communicate with a transceiver located within main controller housing 100. Main controller housing may also include a sensor to determine if the controller 10 is connected or not. If connected, the main controller housing would activate the battery charger, turn off its wireless transceiver, and route signals from data input devices 22 and 62 to the video game console. If not connected, the main controller housing would turn the battery charger off and activate the wireless transceiver.

Having described preferred embodiments for a multimodal controller (which are intended to be illustrative and not limiting), it is noted that modifications and variations can be made by persons skilled in the art in light of the above teachings. For example, the type of data input device may be selected from push-buttons, trackballs, mouse, d-pad without detracting from the inventive features. The shape and configuration of the multimodal controller and main controller housing may be varied without affecting the functionality of the inventive device. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A controller for a software driven processor comprising:
    an articulating controller having:
        a first arcuate segment having a first data input device;
        a second arcuate segment connected by a leaf spring to said first arcuate segment to form a C-shaped spring jaw with said leaf spring biasing said arcuate segments toward each other;
        a multimodal controller segment having a second data input device pivotally coupled to said second arcuate segment; and
        a wireless transmitter coupled to said data input devices and disposed within one of said multimodal controller segment or said arcuate segments.

2. The controller of claim 1, wherein said pivotal coupling between said multimodal controller segment and said second arcuate segment comprises a hinge oriented orthogonal to said leaf spring.

3. The controller of claim 2, wherein said arcuate segments and said leaf spring reside in a first plane, and wherein said multimodal controller segment pivots between a first orientation parallel to said first plane and a second orientation perpendicular to said first plane.

4. The controller of claim 3, wherein said arcuate segments can resiliently flex away from each other to pass over a cylindrical bar then bias toward each other to capture the cylindrical bar within said C-shaped spring jaw.

5. The controller of claim 4, wherein said C-shaped spring jaw is adapted to clip onto a handlebar of exercise equipment.

6. The controller of claim 5, wherein said multimodal controller segment is adapted to be supported against a first side of the handlebar facing a user, so that as a user grabs the handlebar their thumb lies over said second data input device.

7. The controller of claim 6, wherein said second data input device is selected from the group consisting of a button, a maintained contact button, a momentary contact button, a directional pushbutton, an analog joystick, a 4-button d-pad, a trackball, and combinations thereof.

8. The controller of claim 5, wherein said first arcuate segment is adapted to be supported against a second side of the handlebar facing away from a user, so that as a user grabs the handlebar their index finger lies over said first data input device.

9. The controller of claim 5, wherein said first arcuate segment includes a third data input device, wherein said first and third data input devices comprising buttons, wherein said first arcuate segment is adapted to be supported against a second side of the handlebar facing away from a user, so that as a user grabs the handlebar their index and middle fingers lie over said two buttons.

10. The controller of claim 1, wherein the software driven processor is selected from the group consisting of a game console, a tablet and a personal computer.

11. The controller of claim 1, further comprising a main controller housing having a docking station, wherein one of said arcuate segments or multimodal controller segment includes a jack for plugging into said docking station for at least one of wired communication and battery recharging.

12. The controller of claim 11, wherein said jack resides on one of said arcuate segments and first data wires extend from said multimodal controller segment through said pivotal coupling to said second arcuate segment.

13. The controller of claim 11, wherein said jack resides on one of said arcuate segments and second data wires extend from said first arcuate segment to said second arcuate segment.

14. The controller of claim 11, wherein said main controller housing has two docking stations to receive two articulating controllers disposed at the right and left hand sides of said main controller housing for integrated cooperative play.

15. The controller of claim 14, wherein said data input device is selected from the group consisting of a button, a maintained contact button, a momentary contact button, a directional pushbutton, an analog joystick, a 4-button d-pad, a trackball, and combinations thereof.

16. The controller of claim 15, wherein said two articulating controllers are adapted for undocking from said main controller housing and for mounting on the right and left handlebars of exercise equipment to provide the user with remote cooperative player control.

* * * * *